US012800999B2

(12) United States Patent
Wu et al.

(10) Patent No.: US 12,800,999 B2
(45) Date of Patent: Nov. 17, 2026

(54) CAMERA GRIP

(71) Applicant: TILTA INC., Burbank, CA (US)

(72) Inventors: Sen Wu, Shenzhen (CN); Jiawen Kang, Shenzhen (CN); Wenping Zeng, Shenzhen (CN); Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 46 days.

(21) Appl. No.: 19/081,404

(22) Filed: Mar. 17, 2025

(65) Prior Publication Data

US 2025/0314951 A1 Oct. 9, 2025

(30) Foreign Application Priority Data

Apr. 9, 2024 (CN) ......................... 202420732722.5

(51) Int. Cl.

*G03B 17/56* (2021.01)
*G06F 1/18* (2026.01)
*G06F 3/16* (2006.01)

(52) U.S. Cl.

CPC ......... *G03B 17/563* (2013.01); *G03B 17/566* (2013.01); *G06F 1/189* (2013.01); *G06F 3/167* (2013.01)

(58) Field of Classification Search

CPC ..... G03B 17/563; G03B 17/566; G06F 1/189; G06F 3/167

See application file for complete search history.

(56) References Cited

U.S. PATENT DOCUMENTS

| | | | | |
|---|---|---|---|---|
| 9,473,606 | B1 * | 10/2016 | Sumida | H04M 1/72409 |
| 10,440,843 | B2 * | 10/2019 | Deng | A63H 30/04 |
| 2012/0272557 | A1 * | 11/2012 | Yan | F41C 23/16<br>42/72 |
| 2013/0005401 | A1 * | 1/2013 | Rosenhan | H04M 1/724092<br>455/557 |
| 2013/0176412 | A1 * | 7/2013 | Chen | H04N 7/183<br>348/E7.085 |
| 2014/0105591 | A1 * | 4/2014 | Van Norman | G03B 17/38<br>396/544 |
| 2016/0091139 | A1 * | 3/2016 | Levine | F16M 11/041<br>294/139 |
| 2016/0348835 | A1 * | 12/2016 | Blalock | F16B 2/065 |

FOREIGN PATENT DOCUMENTS

| | | |
|---|---|---|
| CN | 217503179 U | 9/2022 |
| CN | 218387579 U | 1/2023 |

* cited by examiner

*Primary Examiner* — Lin Ye
*Assistant Examiner* — Tuan H Le
(74) *Attorney, Agent, or Firm* — LOZA & LOZA, LLP; Derek W. Yeung

(57) ABSTRACT

The present application introduces a camera grip that includes a grip and a disassembly and assembly component. The grip is configured for electrical connection with an external device and features a first side oriented towards this external device. The disassembly and assembly component includes a clamping member and a trigger. The clamping member, movably installed on the grip, includes a first clamping member and a second clamping member positioned opposite each other, with at least some parts of both clamping members extending beyond the first side. The trigger, also movably mounted on the grip, is capable of initiating movement of the first and the second clamping members away from or towards each other.

15 Claims, 10 Drawing Sheets

CAMERA GRIP

CROSS-REFERENCE TO RELATED APPLICATIONS

The present application for patent claims priority to and the benefit of pending Chinese Application No. 2024207327225, filed Apr. 9, 2024, and hereby expressly incorporated by reference herein as if fully set forth below in its entirety and for all applicable purposes.

TECHNICAL FIELD

The present disclosure pertains to the technical realm of photographic accessories, specifically to a camera grip.

INTRODUCTION

As photography and videography become increasingly prevalent in everyday life, more individuals are engaging in shooting activities as part of their routines. During the shooting and imaging process, diverse composition needs often arise, necessitating the attachment of various photographic accessories, such as lights and camera grips, to electronic devices used for shooting and imaging. Taking the camera grip as an example, users typically attach photographic accessories to the casing of electronic devices by screwing them into place. Installation and removal often require tools such as hex wrenches. While this method provides relatively stable mounting of photographic accessories onto the casing of electronic devices, the process is cumbersome and significantly impacts the shooting experience.

BRIEF SUMMARY

The present disclosure introduces a camera grip that addresses the inconvenience associated with the installation and removal of camera grips in prior art, which adversely affects the shooting experience.

According to aspects of the present disclosure, a camera grip including:

- a grip is configured for electrical connection to external devices, featuring a first side facing the external device.
- a disassembly and assembly component, including a clamping member and a trigger. The clamping member is movably positioned on the grip and includes a first clamping member and a second clamping member disposed opposite each other, with at least part of their structures protruding beyond the first side. The trigger is movably arranged on the grip and is capable of actuating the first clamping member and the second clamping member to move apart or towards each other.

BRIEF DESCRIPTION OF THE DRAWINGS

To elucidate the various aspects presented in the present disclosure, the accompanying drawings necessary for describing these examples will be briefly introduced below. It is apparent that the accompanying drawings described herein represent merely some examples of the present disclosure. For those skilled in the art, without the necessity for inventive effort, other drawings can be derived based on the structures depicted in these drawings.

REFERENCE NUMBERS

100—electronic device kit; 101—housing; 102—accommodation cavity; 103—mobile phone; 104—second electronic contact pin; 106—first mounting interface; 107—second mounting interface; 108—control module; 10—camera grip;

1—grip; 11—first side; 111—mounting groove; 112—first accommodation groove; 12—first electronic contact pin; 13—focusing component; 131—dial wheel; 132—magnet; 14—third side; 15—second side; 16—first function key; 17—second function key; 18—audio interface; 19—power interface;

2—disassembly and assembly component; 21—clamping member; 211—first clamping member; 212—second clamping member; 213—first inclined surface; 214—second inclined surface; 215—locking protrusion; 22—trigger; 221—trigger block; 222—trigger button; 223—first groove; 224—second groove; 225—inner wall; 226—limiting groove; 227—second accommodation groove;

4—power supply cable; 41—electric wire; 42—power supply connector;

5—locating part; 51—first limiting post; 52—second limiting post; 53—first reset elastic element; 54—second reset elastic element;

6—locking component; 61—wrench part; 62—locking part; 621—locking groove; 63—locking post;

7—main control module; 71—magnetic encoder;

8—battery compartment; 81—battery;

9—antenna module.

The objectives, functional characteristics, and advantages of the present invention will be further elucidated with reference to the embodiments and accompanying drawings.

DETAILED DESCRIPTION

Aspects of the present disclosure provide a detailed and comprehensive description of various examples embodied within this disclosure, drawing upon the illustrative figures. It is to be understood that the enumerated examples constitute but a fraction of the broader scope and are not exhaustive. Consequently, any alternative examples derived by ordinary technicians in the relevant field, without the necessity for inventive ingenuity, are encompassed within the protective ambit of this disclosure.

Figure 9:
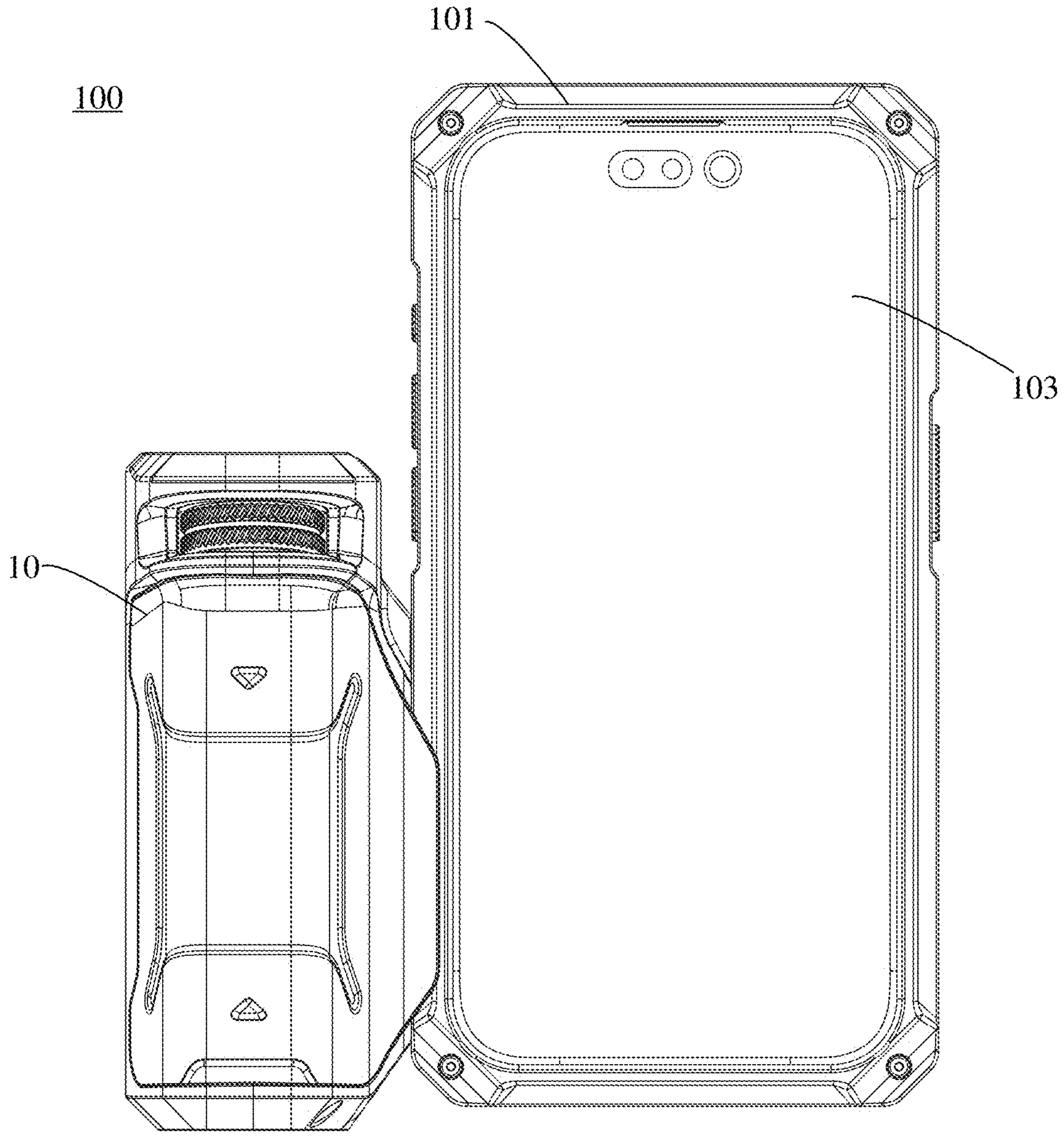
FIG. 9 is a diagram illustrating an electronic device kit according to some aspects of the disclosure.

Referring to FIGS. 1-10, the present disclosure presents a camera grip 10 for connecting an electronic device kit 100 (see FIG. 9). The electronic device kit 100 includes a housing 101 for holding an electronic device. The housing 101 features an accommodation cavity 102 for housing the electronic device (e.g., a mobile phone 103). The housing 101 may provide multiple mounting interfaces or be equipped with multiple electronic contacts (e.g., second electronic contact pins 104 of FIG. 10) for electrical connections.

Figure 1:
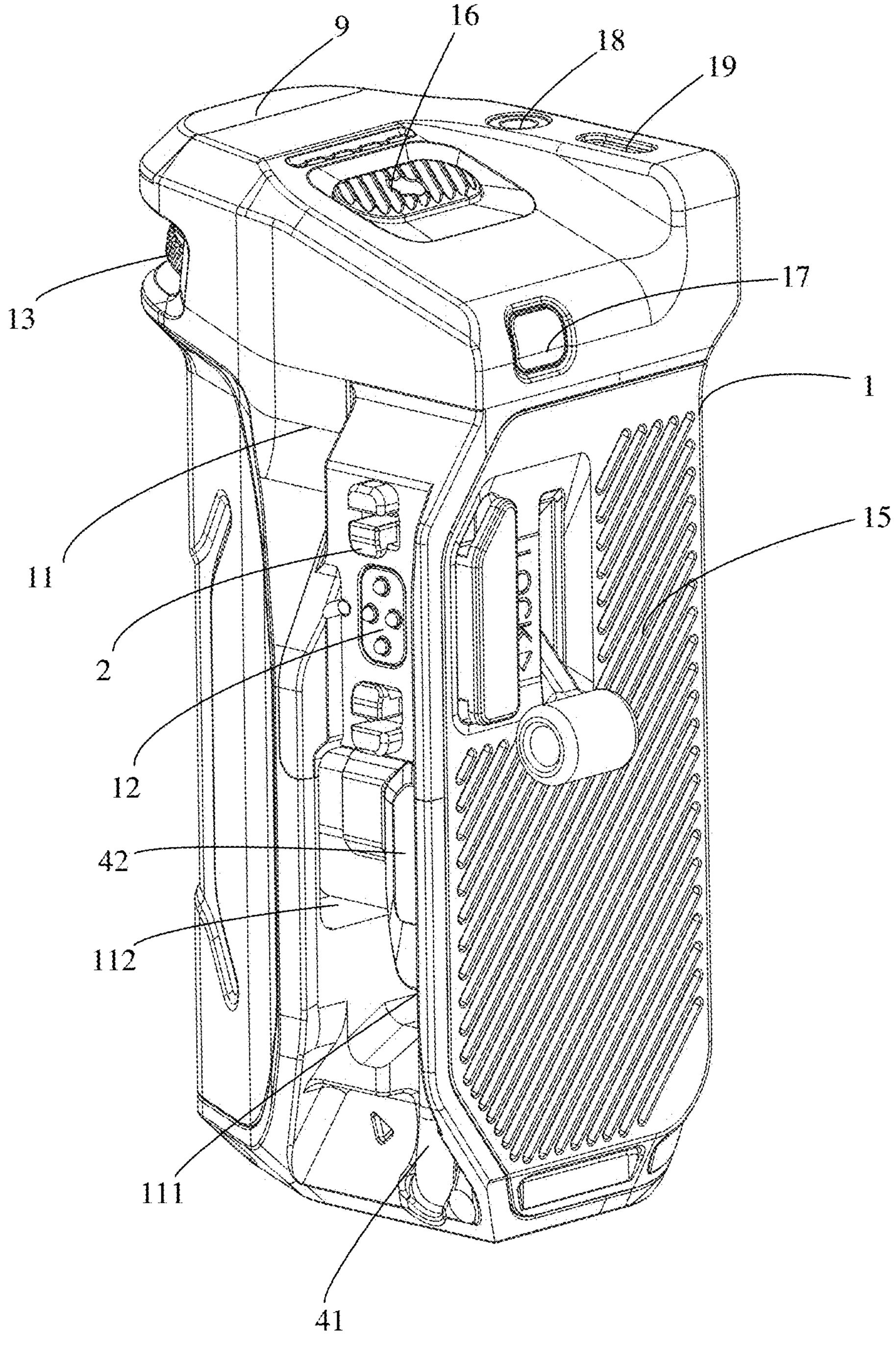
FIG. 1 is a diagram illustrating a camera grip according to some aspects of the disclosure.
Figure 2:
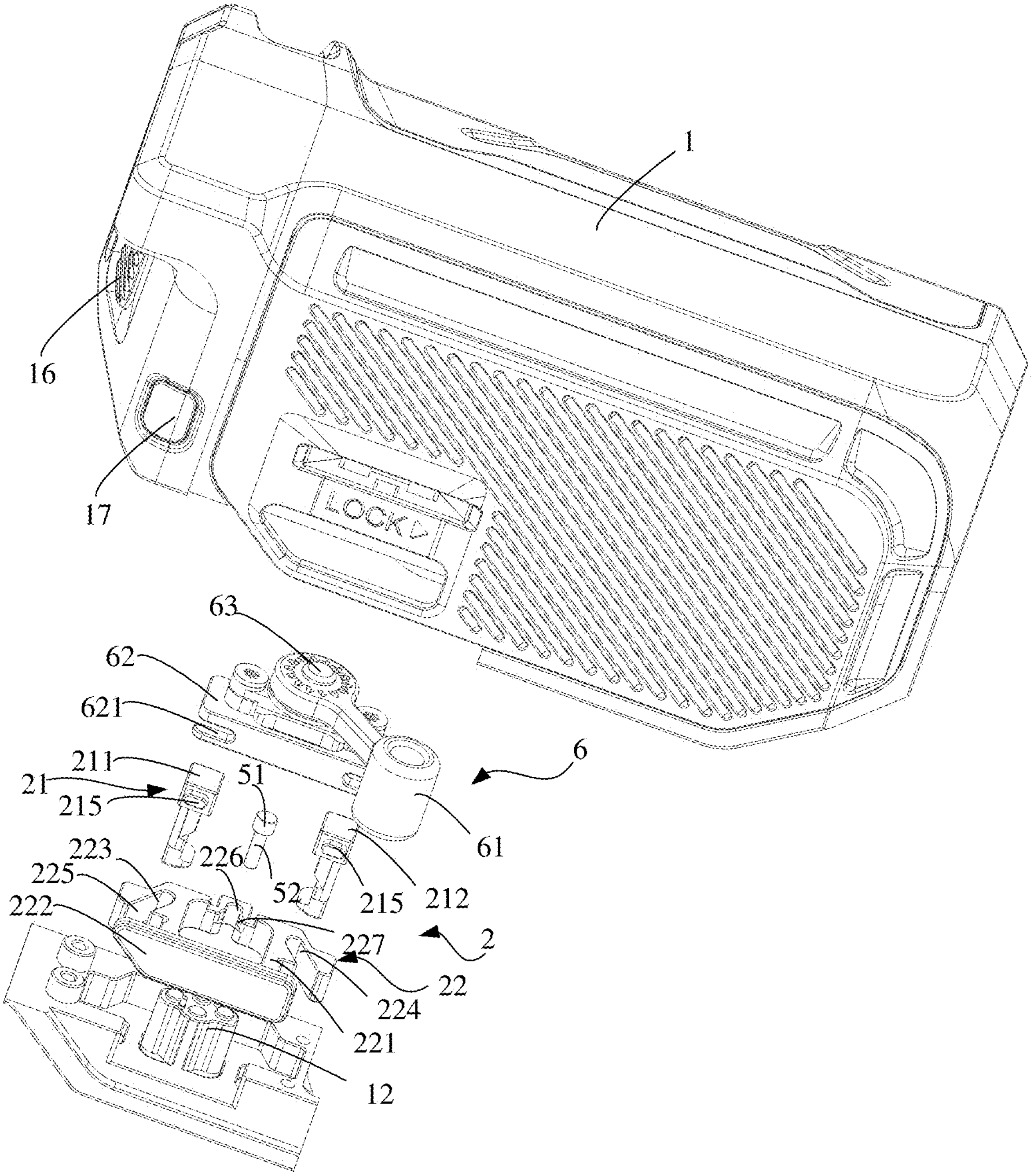
FIG. 2 is a diagram illustrating an exploded diagram of the camera grip of FIG. 1 according to some aspects of the disclosure.

Referring to FIGS. 1-2, the camera grip 10 includes a handle 1 and a disassembly and assembly component 2. The handle 1 is configured for electrical connection to an external device and has a first side 11 facing the external device (e.g., a smartphone). The disassembly and assembly component 2 includes a clamping member 21 (see FIG. 2) and a trigger 22. The clamping member 21 (e.g., a clamping assembly) is movably positioned on the handle 1. The clamping member 21 includes a first clamping member 211 and a second clamping member 212 disposed opposite each other, with at least a part of each the first clamping member 211 and a second clamping member 212 protruding beyond the first side 11. The trigger 22 is movably arranged on the handle 1 and is capable of actuating the first clamping member 211 and the second clamping member 212 to move apart or towards each other.

In some aspects, activation of the trigger 22 drives the first clamping member 211 and the second clamping member 212 to move apart from each other. Consequently, the clamping space between the first clamping member 211 and the second clamping member 212 expands, placing the first clamping member 211 and the second clamping member 212 in a standby installation state. When the first clamping member 211 and the second clamping member 212 are mounted onto the housing 101, the trigger 22 resets, driving the first clamping member 211 and the second clamping member 212 towards each other, thereby securing the camera grip 10 to the housing 101. At this juncture, the first clamping member 211 and the second clamping member 212 are in a clamped state. The disassembly and assembly component 2 allows for the quick attachment or detachment of the camera grip 10 from the housing 101, facilitating the shooting process for photographers.

In another aspect, depending on requirements, the first clamping member 211 and the second clamping member 212 can be adapted to employ a latching method to attach to the housing 101. The trigger 22 can independently drive the first clamping member 211 and the second clamping member 212 towards each other, placing the first clamping member 211 and the second clamping member 212 in a standby installation state. When the first clamping member 211 and the second clamping member 212 are mounted onto the housing 101, the trigger 22 resets, further driving the first clamping member 211 and the second clamping member 212 apart, thereby placing the first clamping member 211 and the second clamping member 212 in a clamped state (or latched state).

In some aspects, the term "external device" pertains to an electronic device kit 100, encompassing an electronic device and a housing 101. The handle 1 establishes an electrical connection with the external device, either directly to the electronic device (e.g., mobile phone 103) or to the housing 101. In some aspects, the camera grip 10 features one or more electrical contacts (e.g., first electronic contact pins 12) positioned on the first side 11, located between the first clamping member 211 and the second clamping member 212. Additionally, electronic contact pins are arranged on the housing 101. For example, when the camera grip 10 is clamped onto the housing 101, with the first side 11 facing the housing, the first electronic contact pin 12 on the first side 11 engages with a second electronic contact pin 104 on the housing 101, thereby facilitating an electrical connection between the camera grip 10 and the housing 101. In one example, the first electronic contact pin 12 of the camera grip 10 is positioned between the first clamping member 211 and the second clamping member 212. The first and second clamping members, respectively located at both ends of the first electronic contact pin 12, securely clamp onto the housing 101, enhancing the stability of the contact between the first electronic contact pin 12 of the camera grip 10 and the second electronic contact pin 104 on the housing 101.

In another aspect, the camera grip 10 includes a power supply cable 4 with an electric wire 41 (e.g., see FIG. 1). The first side 11 is equipped with a mounting groove 111, accommodating the power supply cable 4. During use, the power supply cable 4 can be connected to the mobile phone 103, enabling the camera grip 10 to power the mobile phone 103 via the electric wire 41, facilitating power supply or data transmission, among other functions. In some aspects, the first side 11 can feature a first accommodation groove 112, communicating with the mounting groove 111. The power supply cable 4 includes a power supply connector 42 and an electric wire 41. The electric wire 41 is electrically connected to the handle 1 and can be stored within the mounting groove 111, while the power supply connector 42 can be stored within the first accommodation groove 112 or the mounting groove 111. In some aspects, when an electrical connection with the mobile phone 103 is needed, the power supply connector 42 can be retrieved from the first accommodation groove 112. Conversely, when an electrical connection is not needed, the power supply connector 42 can be placed back in the first accommodation groove 112. It is contemplated that the power supply connector 42 is not limited to connecting solely to the mobile phone 103 but can also interface with other electronic devices.

Figure 3:
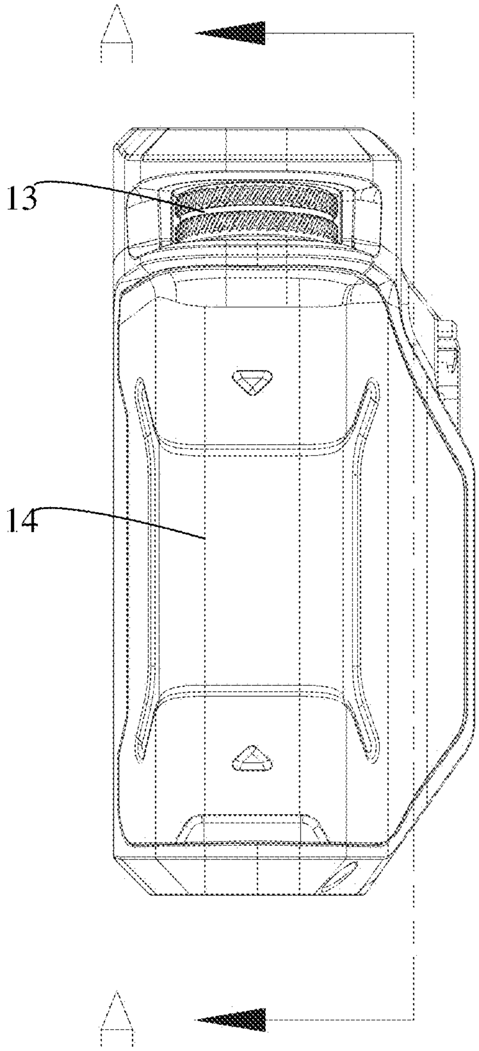
FIG. 3 is a diagram illustrating a front view of the camera grip according to some aspects of the disclosure.
Figure 4:
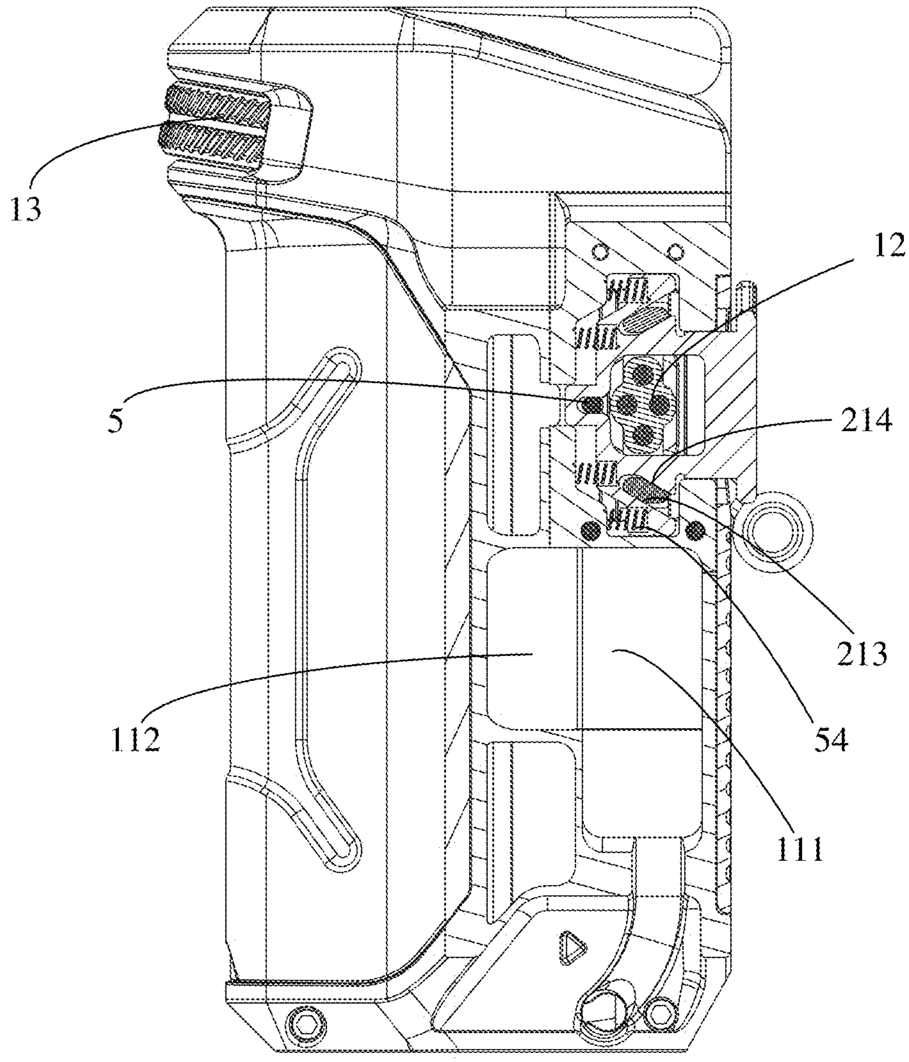
FIG. 4 is a diagram illustrating a sectional view taken along plane line A-A in FIG. 3 according to some aspects of the disclosure.

In some aspects, as illustrated in FIGS. 2-4, the trigger 22 includes a trigger block 221 and a trigger button 222. The trigger button 222 is attached to the trigger block 221 and protrudes from the first side 11. The trigger block 221 is movably installed within the handle 1 and is equipped with a first groove 223 and a second groove 224, corresponding to the first clamping member 211 and the second clamping member 212, respectively. The first clamping member 211 fits (at least partially) within the first groove 223, and the second clamping member 212 fits (at least partially) within the second groove 224. The inner walls 225 of both the first groove 223 and the second groove 224 are inclined, allowing the first clamping member 211 to mate with or engage the inclined inner wall 225 of the first groove 223 and the second clamping member 212 to mate with or engage the inclined inner wall 225 of the second groove 224. This configuration enables the first clamping member 211 and the second clamping member 212 to move towards or away from each other. In some aspects, pressing the trigger button 222 causes the inclined inner walls 225 of both the first groove 223 and the second groove 224 to push the first clamping member 211 and the second clamping member 212 to slide along the inner walls 225, facilitating the mounting of the camera grip onto the housing 101 of the electronic device. Once mounted, the trigger 22 can reset (e.g., released from the pressed position). At this point, the inclined inner walls 225 push the first clamping member 211 and the second clamping member 212 to also reset (e.g., move toward each other), ensuring the first clamping member 211 and the second clamping member 212 press tightly against the housing 101 of the electronic device. When disassembly is needed, pressing the trigger button 222 again causes the inclined inner walls 225 to push the first clamping member 211 and the second clamping member 212 to slide, spreading the first clamping member 211 and the second clamping member 212 open or further apart for easy disassembly. It is worth noting that opposite sides of the first clamping member 211 and the second clamping member 212 are equipped with a first inclined surface 213 (e.g., see FIG. 4) and a second inclined surface 214, respectively. At least one of the first inclined surface 213 and the second inclined surface 214 abuts against the inner walls 225 of the corresponding moving grooves 223 and 224. In some aspects, the first inclined surface 213 and the second inclined surface 214 can be parallel. Furthermore, a curved surface can be provided between the first inclined surface 213 and the second inclined surface 214 to facilitate smooth movement within the first groove 223 and the second groove 224, respectively.

Figure 5:
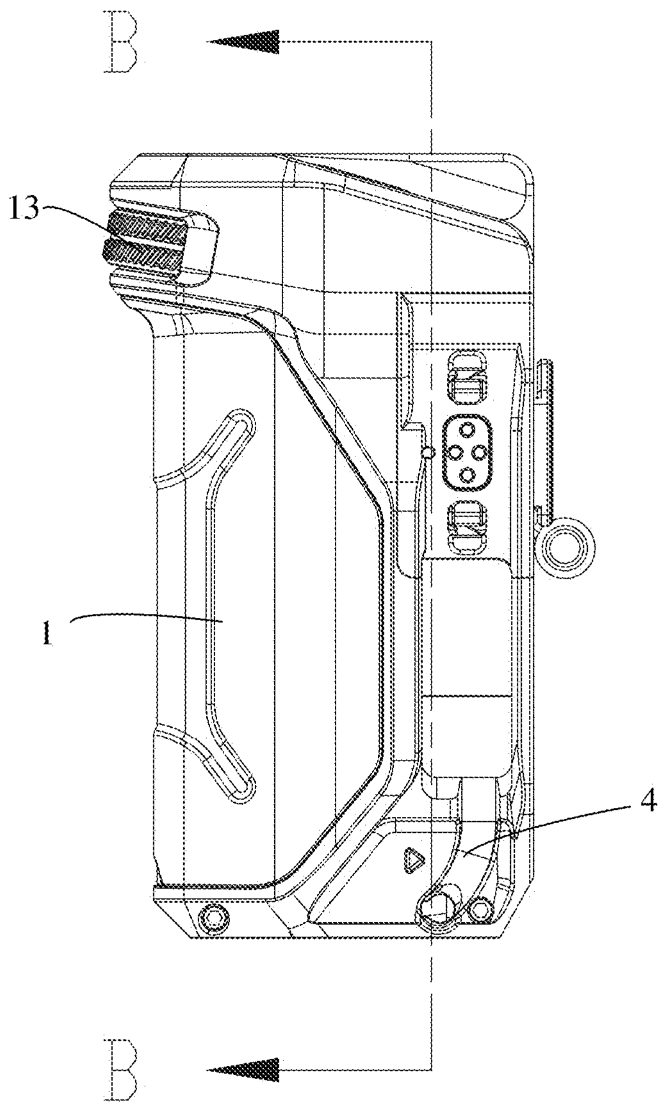
FIG. 5 is a diagram illustrating a right-side view of the camera grip according to some aspects of the disclosure.
Figure 6:
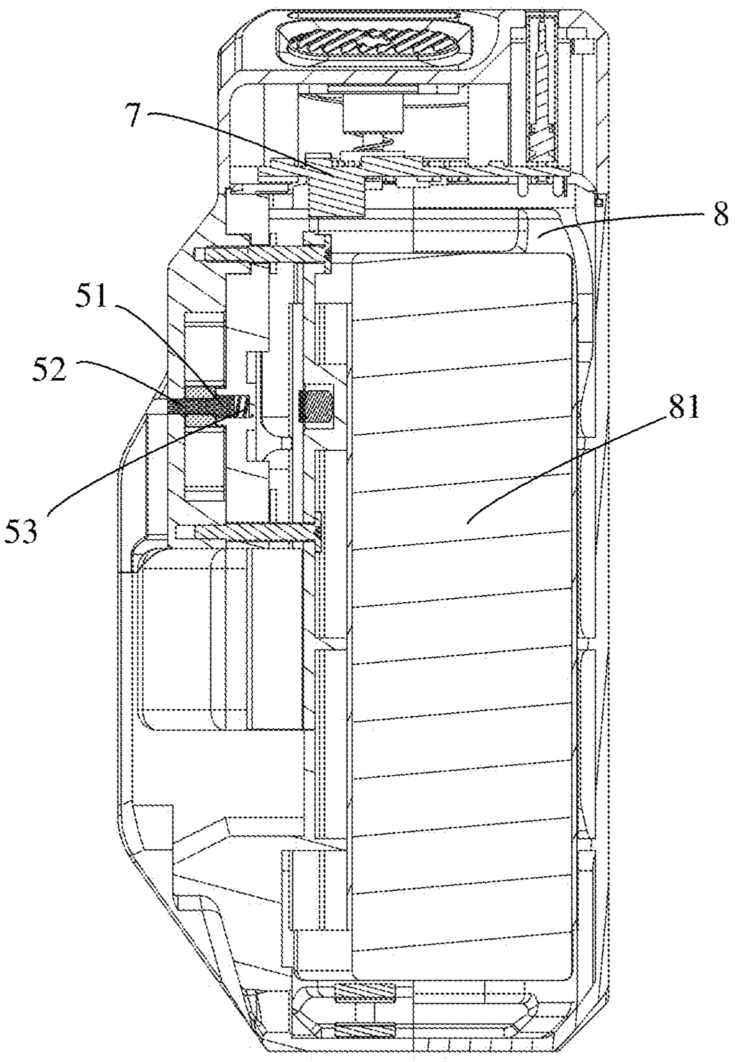
FIG. 6 is a diagram illustrating a sectional view taken along plane line B-B in FIG. 5 according to some aspects of the disclosure.
Figure 7:
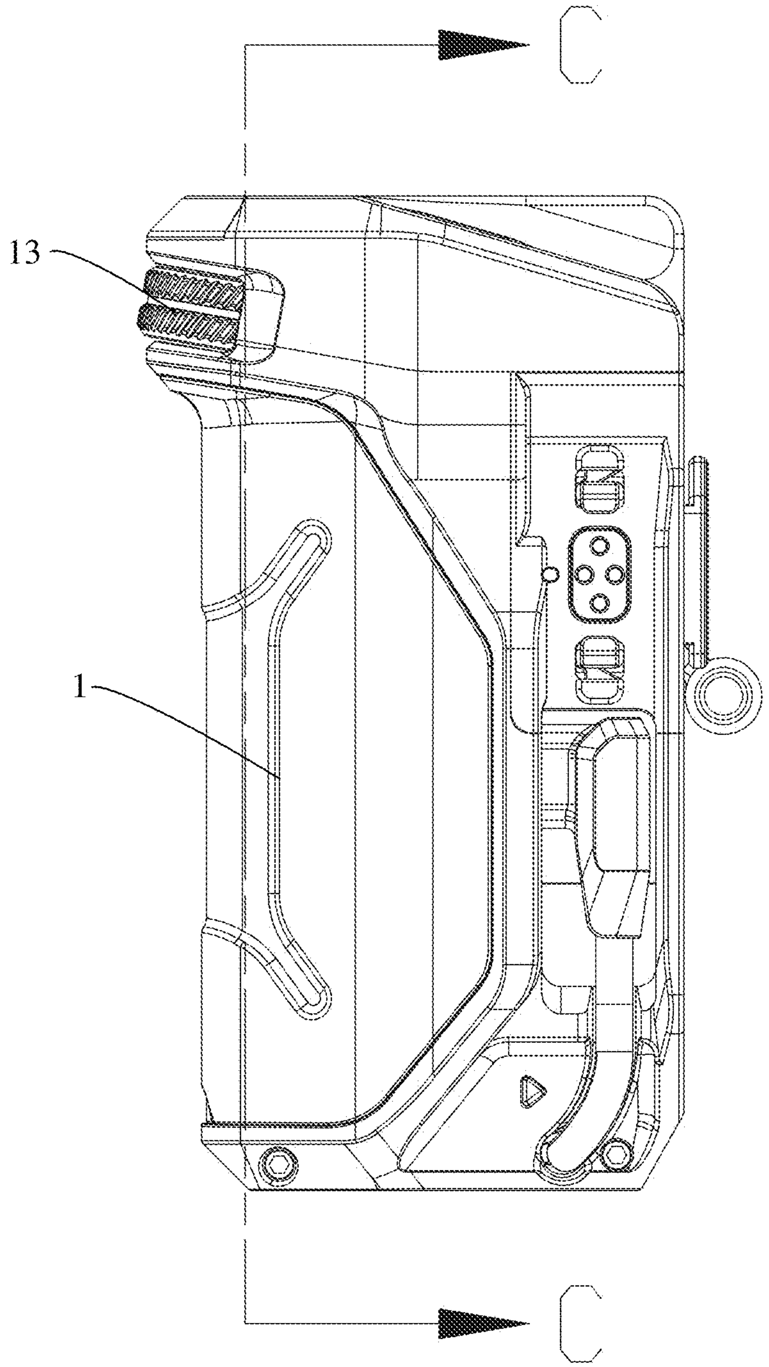
FIG. 7 is a diagram illustrating another right-side view of the camera grip according to some aspects of the disclosure.
Figure 8:
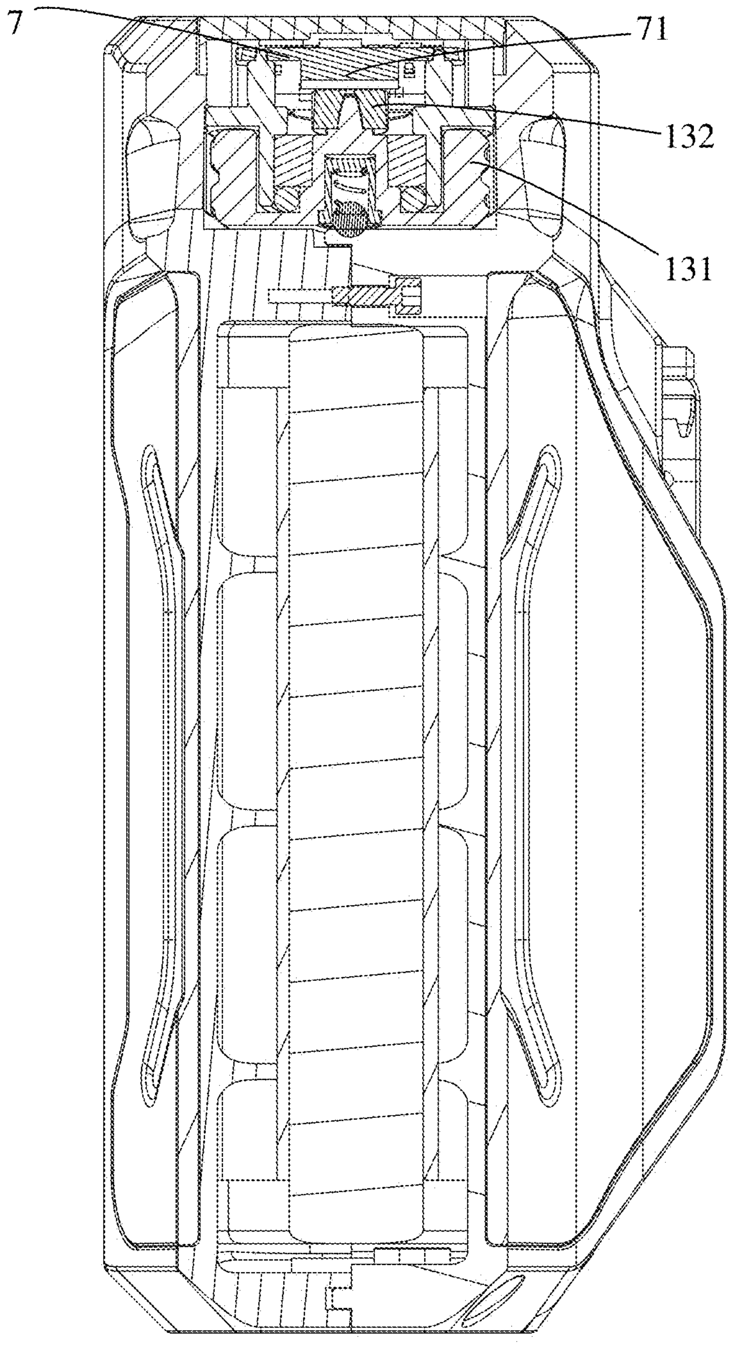
FIG. 8 is a diagram illustrating a sectional view taken along plane line C-C in FIG. 7 according to some aspects of the disclosure.

In some aspects, referring to FIGS. 2 and 5-6, the camera grip 10 additionally features a locating part 5 (e.g., parts 51 and 52). The trigger block 221 incorporates a limiting groove 226 for housing the locating part 5. The locating part 5 is movably attached to the handle 1. Pressing the trigger button 222 towards the locating part 5 propels the trigger block 221, causing the locating part 5 to disengage from the limiting groove 226 and restrict the trigger block from movement. Consequently, the locating part 5 extends outward from the handle 1, with part (e.g., a portion of part 52) of the structure protruding beyond the handle 1. In some aspects, the first groove 223 and the second groove 224 are inclined in opposing directions from the end of the trigger block 221 adjacent to the locating part 5. As the trigger button 222 moves towards the locating part 5, initiating the movement of the trigger block 221 towards the locating part 5, the first clamping member 211 and the second clamping member 212 separate, transitioning to a standby installation position. Upon clamping an external structure, such as the housing 101 of an electronic device, the external structure actuates the locating part 5 to retract within the handle 1. This retraction triggers the reset of the trigger block 221, securing the first clamping member 211 and the second clamping member 212 in a clamped position. In this example, the external structure can refer to the housing 101 of an electronic device. In the installed state, the first clamping member 211 and the second clamping member 212 maintain a separation, allowing the locating part 5 to be exposed outside the handle 1. When the first clamping member 211 and the second clamping member 212 secure onto the housing 101, the locating part 5 compresses against the outer sidewall of the housing 101, retracting towards the interior of the handle 1. At this point, the trigger block 221 resets, and the locating part 5 re-engages with the limiting groove 226, with the first clamping member 211 and the second clamping member 212 in a clamped configuration.

In some aspects, the locating part 5 includes a first limiting post 51 and a second limiting post 52, with a first reset elastic element 53 positioned between the first limiting post 51 and the base (e.g., locking part 62 of FIG. 2). The first limiting post 51 has a larger diameter than the second limiting post 52, allowing the second limiting post 52 to engage with the limiting groove 226. Pressing the trigger button 222 propels the trigger block 221, causing the second limiting post 52 to disengage from the limiting groove 226. Subsequently, the first reset elastic element 53 triggers the second limiting post 52 to move outward from the handle 1, with the first limiting post 51 following suit. Due to the larger diameter, the first limiting post 51 hinders re-engagement with the limiting groove 226, thus restricting the trigger block 221 from movement (e.g., reset). At this stage, the first clamping member 211 and the second clamping member 212 are in a standby installation position. When the first clamping member 211 and the second clamping member 212 secure onto the housing 101, the second limiting post 52 compresses against the outer sidewall of the housing 101, retracting towards the interior of the handle 1. Concurrently, the first limiting post 51 also retracts, compressing the first reset elastic element 53. With the first limiting post 51 no longer restricting movement, the trigger block 221 quickly resets, and the second limiting post 52 re-engages with the limiting groove 226, securing the first clamping member 211 and the second clamping member 212 in a clamped position. Furthermore, the trigger block includes a second accommodation groove 227 configured to house the first limiting post 51 and communicate with the limiting groove 226. Pressing the trigger button 222 propels the trigger block 221, causing the second limiting post 52 to disengage from the limiting groove 226. At this point, the first limiting post 51 can be accommodated within the second accommodation groove 227, restricting the trigger block from movement. When the second limiting post 52 compresses against the outer sidewall of the housing 101, retracting towards the interior of the handle 1, the first limiting post 51 exits the second accommodation groove 227, allowing the trigger block to reset. Subsequently, the second limiting post 52 re-engages with the limiting groove 226. It is worth noting that in some aspects, a second reset elastic element 54 is positioned between the trigger block 221 and the handle 1. Once the first limiting post 51 exits the second accommodation groove 227, the second reset elastic element 54 drives the trigger block 221 to reset.

Referring to FIG. 2, in another aspect, the camera grip 10 additionally includes a locking component 6 movably positioned on the handle 1. The locking component 6 cooperates with both the first clamping member 211 and the second clamping member 212 to secure the first clamping member 211 and the second clamping member 212 in place. In some aspects, the locking component 6 facilitates a secondary locking mechanism for the camera grip 10 onto the housing 101, substantially minimizing any play between the camera grip 10 and the housing 101. Consequently, the disclosed camera grip 10 enables an ultra-stable installation of photographic accessories onto the housing 101. Specifically, when the first clamping member 211 and the second clamping member 212 are in the clamped position, the locking component 6 can be engaged to place the clamping members into a locked state beyond the clamped state, further tightening the clamping members with the housing. When disassembly is necessary, the locking component 6 is disengaged, returning the clamping members to their clamped state. Further activation of the trigger 22 then causes the first clamping member 211 and the second clamping member 212 to separate, reverting to a state ready for installation and allowing the camera grip 10 to be easily removed from the housing 101.

Referring to FIG. 1-2, the locking component 6 includes a wrench part 61, a locking part 62, and a locking post 63. The locking part 62 is movably positioned in the handle 1 and works in conjunction with both the first clamping member 211 and the second clamping member 212. One end of the locking post 63 attaches to the locking part 62, while the other end connects to the wrench part 61. The handle 1 features a second side 15 adjacent to the first side 11, with parts of the wrench part 61 and the trigger 22 protruding from the second side 15. Activation of the wrench part 61 drives the movement of the locking part 62 via the locking post 63, and the movement of the locking part 62 in turn engages the first clamping member 211 and the second clamping member 212 onto an external device. Specifically, in some aspects, one end of the locking post 63 is threadedly attached to the locking part 62, with the other end connected to the wrench part 61. Rotation of the wrench part 61, due to the threaded connection, causes the locking part 62 to move closer to the upper end of the handle I relative to the threads of the locking post 63, resulting in a tighter engagement among the wrench part 61, the handle 1, and the locking part 62. In another aspect, the locking post can be fixedly connected at one end to the locking part and threadedly connected at the other end to the wrench part 61. When the wrench part 61 is pulled, the locking post 63 drives the locking part 62 towards the wrench part 61, enhancing the tightness of the connection between the wrench part 61 and the locking post 63. As the locking part 62 moves inward towards the interior of the handle 1, the locking part 62 engages the first clamping member 211 and the second clamping member 212 to tighten the housing 101, securing the camera grip onto the housing 101.

Referring to FIGS. 2 and 4 for more detail on the cooperation between the locking part 62, the first clamping member 211, and the second clamping member 212. Locking grooves 621 are provided at both ends (opposite ends) of the locking part 62, while locking protrusions 215 are arranged on both the first clamping member 211 and the second clamping member 212. The locking protrusions 215 fit within the locking grooves 621, enabling the locking part 62 to secure the first clamping member 211 and the second clamping member 212 onto an external device. In some aspects, when the clamping members 211 and 212 are in the clamped position, tightening the wrench part 61 drives the locking post 63 and the locking part 62 to rotate relative to each other. This action causes the locking part 62 to move towards the upper end of the handle 1. Since the locking protrusions 215 of both the first clamping member 211 and the second clamping member 212 are retained within the locking grooves 621, movement of the locking part 62 pulls the first clamping member 211 and the second clamping member 212 together, placing the first clamping member 211 and the second clamping member 212 in a locked state in addition to the clamped state, further tightening the clamping members with the external device. When disassembly is required, loosening the wrench part 61 releases or loosens the locking part 62, allowing the clamping members to transition from the dual-locked state back to the clamped state. Further activation of the trigger 22 then causes the first clamping member 211 and the second clamping member 212 to separate and return to a state ready for installation, enabling the detachment of the camera grip 10 from the housing 101.

In some aspects, referring to FIGS. 3 and 7-10, the camera grip 10 additionally includes a focusing component 13 and a main control module 7. The main control module 7 is positioned on the handle 1, while the handle 1 features a third side 14 adjacent to the first side 11. The focusing component 13 is movably mounted on the third side 14 and is electrically interconnected with the main control module 7. In some aspects, the third side 14 is situated next to the first side 11. When the camera grip 10 is attached to the housing 101 with the first side 11 facing the housing 101, a user grasps the camera grip 10, allowing the third side 14 to potentially come into contact with the user's fingers. As illustrated in FIG. 9, when mounted on the left side of the housing 101, the third side 14 may engage the user's thumb. Conversely, when mounted on the right side of the housing 101, the third side 14 may contact other fingers, such as the index finger, facilitating user manipulation of the focusing component 13. For example, the user can manipulate the focusing component 13 to alter the focal length (or any other features) of the mobile phone 103. In some aspects, a magnetic encoder 71 is integrated within the main control module 7, and the focusing component 13 includes a dial wheel 131 and a magnet 132. The dial wheel 131 is rotatably mounted on the handle 1 and can be connected via a bearing, with the magnet 132 affixed to the top of the dial wheel 131. The magnet 132 is positioned in proximity to the magnetic encoder 71. Rotation of the dial wheel 131 causes the magnet 132 to rotate concurrently. The main control module 7 can determine the angle of rotation of the dial wheel 131 through the magnetic encoder 71, enabling control over the mobile phone 103 to adjust to the corresponding focus value. Notably, the second side 15 can be positioned opposite to the third side 14 on the handle 1, or the second side 15 and the third side 14 may share the same side. Considering the camera grip 10 installed on the left side of the housing 101 in FIG. 9, when the second side 15 opposes the third side 14, the user holds the camera grip 10 with the palm, enabling thumb operation of the focusing component 13 while other fingers can manipulate the trigger button 222 or the locking lever. Alternatively, when the second side 15 and the third side 14 are on the same side, the user holds the camera grip 10 with the palm, allowing either the thumb or other fingers to operate the focusing component 13, trigger button 222, and locking lever interchangeably.

In some aspects, the camera grip 10 can include an antenna module 9 and a first function key 16, both positioned atop the handle 1 and electrically interconnected with the main control module 7. In some aspects, the antenna module 9 facilitates connectivity (e.g., data and control communication) between the camera grip 10 and electronic devices. In one example, the wireless module can be a Bluetooth module or a 2.4 GHz wireless module. The first function key 16 can be configured to execute various functions of the camera grip 10, such as serving as a charging switch, record button, camera button, among others. In some aspects, the specific function executed depends on the duration of activation, which is not restricted here. For instance, a long press may activate charging. In some aspects, the camera grip 10 can include a second function key 17 for menu selection and similar functions of the camera grip 10. For example, the sensitivity of adjustments made via the focusing component 13 can be selected or adjusted through the second function key 17.

In some aspects, the camera grip 10 can include a battery compartment 8 (e.g., sec FIG. 6) for accommodating a battery 81, capable of powering the camera grip 10, the housing 101, electronic devices, and the like. It is noted that electronic components of the camera grip 10, such as the battery 81, main control module 7, electronic contact pins, first function key 16, second function key 17, focusing component 13, and power supply cable 4/electric wires 41, are all electrically interconnected.

In some aspects, the camera grip 10 can feature an audio interface 18 (e.g., see FIG. 1) and a power interface 19, positioned atop the camera grip and electrically connected to the main control module 7. In one example, the audio interface 18 facilitates the connection of a microphone, whereas the power interface 19 enables the attachment of other electronic accessories in the photography industry, like lights.

Figure 10:
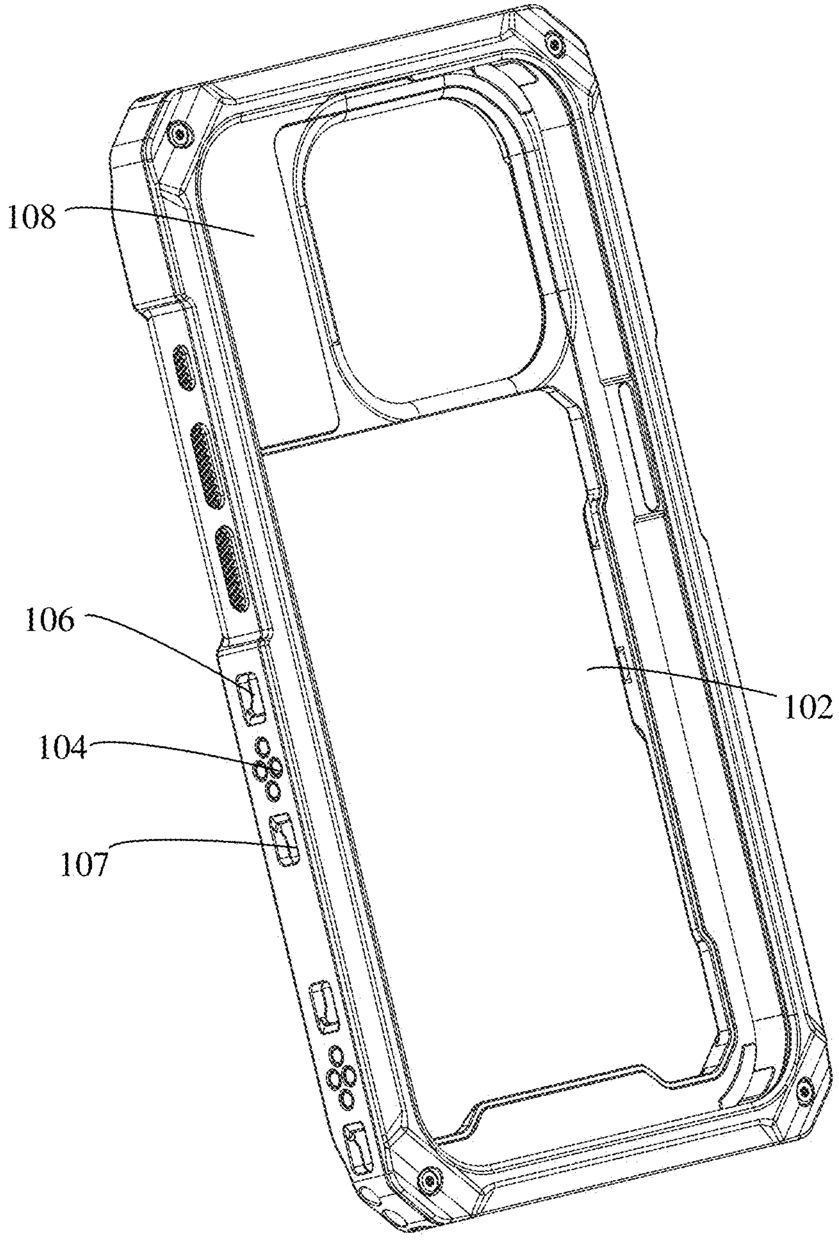
FIG. 10 is a diagram illustrating a housing according to some aspects of the disclosure.

To summarize, users can effortlessly and swiftly mount the camera grip 10 described herein onto external devices, such as the housing 101 of a mobile phone 103 kit. Referring to FIG. 10, the housing 101 can be equipped with a first mounting interface 106 and a second mounting interface 107, with second electronic contact pins 104 located between the first mounting interface 106 and the second mounting interface 107. Referring to FIG. 4, first electronic contact pins 12 can be arranged between the first clamping member 211 and the second clamping member 212. The first clamping member 211 and the second clamping member 212 can clamp onto the first mounting interface 106 and the second mounting interface 107, respectively, thereby establishing an electrical connection between the first and the second electronic contact pins 12 and 104. This clamping action effectively attaches the camera grip 10 to the housing 101.

In some aspects, to further augment the capabilities of the housing 101 and facilitate the utilization of photography accessories, a control module 108 and a connecting cable (omitted from the illustrations) are incorporated and are housed within an accommodation cavity 102. The side wall of the housing 101 features at least one first mounting interface 106 and one second mounting interface 107, with second electronic contact pins 104 disposed therebetween. The connecting cable is terminated at both ends to the second electronic contact pins 104 and the control module 108, respectively. The part of the camera grip 10 adjacent to the housing 101 is equipped with first electronic contact pins 12. The first electronic contact pins 12 interface with the second electronic contact pins 104 to enable circuit completion.

The aforementioned examples serve as exemplary illustrations and do not constitute limitations on the scope of the patent claims presented herein. Any structural modifications that are deemed equivalent, based on the disclosure and drawings of this disclosure, or their direct/indirect disclosure in related technical domains, fall within the ambit of patent protection afforded to the disclosure, in line with its underlying concept.

As used in the claims, the indefinite articles "a" and "an" should be understood to mean "one or more" unless explicitly stated otherwise or unless the context clearly dictates a singular interpretation. The use of these articles does not limit the claimed invention to a single instance of the referenced element but rather encompasses multiple instances where applicable.

What is claimed is:

1. A camera grip comprising:
- a handle configured to electrically connect with an external device, with a first side of the handle facing the external device;
- a disassembly and assembly component, comprising a clamping member and a trigger;
- wherein the clamping member is movably provided on the handle, comprises a first clamping member and a second clamping member, and at least a part of the first clamping member and at least a part of the second clamping member both protruding from the first side; and
- wherein the trigger is movably provided on the handle, configured to move the first clamping member and the second clamping member to move between a first configuration, in which the first clamping member and the second clamping member move away from each other, and
- a second configuration, in which the first clamping member and the second clamping member move toward each other.

2. The camera grip according to claim 1, further comprising:
- an electronic contact pin provided on the first side of the handle, wherein the electronic contact pin is between the first clamping member and the second clamping member.

3. The camera grip according to claim 1, further comprising:
- a power supply cable,
- wherein the first side of the handle is provided with a mounting groove to accommodate the power supply cable.

4. The camera grip according to claim 3, further comprising:
- a focusing component and a control module;
- wherein the control module is provided on the handle, and the handle comprises a third side adjacent to the first side; and
- wherein the focusing component is movably mounted on the third side and electrically connected to the control module.

5. The camera grip according to claim 4, further comprising:
- an antenna module and a first function key, wherein both the antenna module and the first function key are positioned on top of the handle and electrically connected to the control module.

6. The camera grip according to claim 4, further comprising:
- an audio interface and a power interface, wherein the audio interface and the power interface are positioned on top of the handle and electrically connected to the control module.

7. The camera grip according to claim 3, wherein an accommodation groove is provided on the first side, communicating with the mounting groove;
- wherein the power supply cable, comprising a power supply connector and an electric wire, connects electrically to the handle; and
- wherein the electric wire fits into the mounting groove, and the power supply connector is configured to store in the accommodation groove or the mounting groove.

8. The camera grip according to claim 1, further comprising:
- a locking component movably provided on the handle, and the locking component is configured to cooperate with the first clamping member and the second clamping member to lock the first clamping member and the second clamping member.

9. The camera grip according to claim 8, wherein the locking component comprises a wrench part, a locking post, and a locking part;
- wherein the locking part, that is movably provided in the handle, cooperates with the first clamping member and the second clamping member;
- wherein a first end of the locking post is connected to the locking part, and a second end of the locking post is connected to the wrench part;
- wherein the handle comprises a second side adjacent to the first side, and a part of the wrench part and a part of the trigger protruding outside the second side; and in response to an actuation of the wrench part, the locking part is configured to drive the first clamping member and the second clamping member between a lock position and a release position.

10. The camera grip according to claim 9, wherein a locking groove is provided on each of opposite ends of the locking part, and each of the first clamping member and the second clamping member is provided with a locking protrusion, the locking protrusion is provided within the corresponding locking groove, enabling the locking part to secure the first clamping member and the second clamping members onto the external device.

11. The camera grip according to claim 10, wherein two opposite sides of the first clamping member and two opposite sides of the second clamping member are each provided with a locking projection;

wherein two ends of the locking part comprise a plurality of locking grooves corresponding to the locking projection, and an avoidance position is disposed between two locking grooves of the plurality of locking grooves at each end of the locking part; and wherein the first clamping member and the second clamping member are provided in corresponding avoidance positions, and the locking projection on both sides of the first clamping member and the locking projections on both sides of the second clamping member are provided in corresponding locking grooves.

12. The camera grip according to claim 1, wherein the trigger comprises a first groove and a second groove respectively corresponding to the first clamping member and the second clamping member; and wherein the first clamping member cooperates with the first groove, the second clamping member cooperates with the second groove, and the trigger is configured to drive the first clamping member and the second clamping member to move apart from or move towards each other via the first groove and the second groove.

13. The camera grip according to claim 12, wherein the trigger comprises a trigger block and a trigger button;

wherein the trigger button is connected to the trigger block and protrudes outside the first side;

wherein the trigger block is movably installed inside the handle and comprises the first groove and second groove respectively corresponding to the first clamping member and the second clamping member;

wherein the first clamping member fits into the first groove and the second clamping member fits into the second groove, and an inner wall of the first groove and an inner wall of the second groove are provided with an inclined surface; and wherein the first clamping member cooperates with the inclined surface of the inner wall of the first groove, and the second clamping member cooperates with the inclined surface of the inner wall of the second groove, enabling the first clamping member and the second clamping member to move away from or move toward each other.

14. The camera grip according to claim 13, further comprising:

a locating part, the trigger block comprises a limiting groove accommodating the locating part, and the locating part is movably connected to the handle;

in response to an actuation of the trigger button, the locating part is configured to exit the limiting groove and restrict the trigger block from movement, enabling at least a part of the locating part to protrude outside the handle.

15. The camera grip according to claim 14, wherein the locating part comprises a first limiting post and a second limiting post;

wherein the first limiting post comprises a larger diameter than that of the second limiting post;

wherein the trigger block is provided with an accommodation groove and the accommodation groove connects to the limiting groove;

wherein the second limiting post is configured to exit the limiting groove and the first limiting post resides within the accommodation groove when the first clamping member and the second clamping member are in a ready-to-install state; and wherein the first limiting post is configured to exit the accommodation groove and the second limiting post resides within the limiting groove when the first clamping member and the second clamping member are in a clamped state.

* * * * *